United States Patent
Koberstein et al.

(10) Patent No.: US 6,854,271 B2
(45) Date of Patent: Feb. 15, 2005

(54) HYDRAULIC ACTUATION DEVICE IN MOTOR VEHICLES

(75) Inventors: Ralf Koberstein, Wartmannsroth-Völkersleier (DE); Klaus Reuter, Oberthulba-Hetzlos (DE); Klaus Krappmann, Gochsheim (DE)

(73) Assignee: ZF Sachs AG, Schweinfurt (DE)

( * ) Notice: Subject to any disclaimer, the term of this patent is extended or adjusted under 35 U.S.C. 154(b) by 140 days.

(21) Appl. No.: 10/401,621

(22) Filed: Mar. 28, 2003

(65) Prior Publication Data

US 2003/0189277 A1 Oct. 9, 2003

(30) Foreign Application Priority Data

Apr. 3, 2002 (DE) .......................................... 102 14 599

(51) Int. Cl.⁷ ................................................. B60T 11/26
(52) U.S. Cl. ...................................................... 60/588
(58) Field of Search ............ 188/322.15; 267/286–291; 60/588; 92/170.1, 255, 169.1, 172, 129

(56) References Cited

U.S. PATENT DOCUMENTS

| 2,125,986 A | 8/1938 | Bowen |
| 4,831,916 A | * 5/1989 | Leigh-Monstevens et al. ............. 92/129 |
| 5,121,686 A | * 6/1992 | Schonlau et al. .............. 60/588 |
| 6,378,304 B1 | * 4/2002 | Angione ....................... 60/588 |
| 6,408,623 B1 | * 6/2002 | Mollier et al. ................ 60/588 |
| 6,443,048 B1 | 9/2002 | Fischbach |

FOREIGN PATENT DOCUMENTS

| DE | 198 47 529 A1 | 9/1999 |
| DE | 199 07 298 A1 | 8/2000 |
| JP | 60205069 | 10/1985 |

* cited by examiner

Primary Examiner—Robert A. Siconolf
Assistant Examiner—Melanie Torres
(74) Attorney, Agent, or Firm—Cohen, Pontani, Lieberman & Pavane

(57) ABSTRACT

A pressure cylinder for a hydraulic actuation device in motor vehicles includes a housing (1) with an internal cylinder (2,3). A piston (6) is displaceable in the internal cylinder for forming a pressure space (12) for a hydraulic fluid. The piston includes a hemispherical socket (10) in an indentation (9). A spring (18) is arranged in the pressure space (12), and a tappet (7) is connected by a transmission part with a hemispherical cap (8). The tappet (7) is in a frictional and swivelable engagement in the socket (10) in an indentation (9) by the force of the spring (18). The piston is a deep-drawn, cup-shaped part and includes a filling piece (13) in the interior of the piston (6). An annular space (15) is disposed at a piston surface (14) facing toward the pressure space (12). The annular space (15) is for receiving the spring (18) in a compressed state when the piston (6) is in a top dead center position.

9 Claims, 2 Drawing Sheets

HYDRAULIC ACTUATION DEVICE IN MOTOR VEHICLES

PRIORITY CLAIM

This application claims priority to DE 102 14 599.7 filed on Apr. 3, 2002 in Germany.

FIELD OF THE INVENTION

The present invention is directed to a pressure cylinder of a hydraulic actuation device in motor vehicles and in particular to a slave cylinder wherein a tappett is in frictional engagement with a piston by a spring force.

BACKGROUND OF THE INVENTION

A pressure cylinder, particularly a slave cylinder for a hydraulic actuation of a clutch or a brake, is manufactured in series and marketed in the structural shape described herein. The piston is formed as a deep-drawn, cup-shaped, part and has a cylindrical jacket surface by which it is arranged in an internal cylinder of the housing so as to be axially displaceable. A seal, which is fixedly arranged, in the housing encircles the cylindrical jacket surface of the piston and accordingly seals the pressure space with the hydraulic fluid against the atmosphere. A base with the indentation and the hemispherical cup or socket serving as a frictionally locking and swivelable support for the transmission part of the tappet is formed at the piston. An edge that is formed around the indentation serves in the interior of the piston and accordingly in the pressure space of the hydraulic fluid as a support for the spring which holds the piston under pretensioning against the inner end face of the housing.

While a spring with the desired flat characteristic is easily accommodated in the relatively long cavity of the piston, air bubbles also remain in the latter and can not escape into a pressure medium line especially when deaerating or after the hydraulic system is filled because they are prevented from escaping by the long spatial shape in the piston or by the coils of the spring arranged therein. Also, when the pressure cylinder is arranged obliquely, it is to be expected that a quantity of residual air will remain in the hydraulic system and impairs the function of the hydraulic system by its compressibility.

DE 199 07 298.1 discloses a master cylinder of a hydraulic system for a clutch or a brake in a motor vehicle which has a housing having a connection piece for a hydraulic line leading to a slave cylinder and for a channel or duct leading to a reservoir for hydraulic fluid. A piston, which is arranged in the housing so as to be displaceable, forms a variable pressure space and has a control of the duct leading to the reservoir depending upon the position of the piston.

The shape of the pressure space appears to offer an ideal shape for complete deaeration when filling the hydraulic system. Contrary to the present invention which includes a spring, DE 199 07 298.1 discloses a master cylinder wherein a spring in the pressure space may be omitted.

SUMMARY OF THE INVENTION

In the present invention, a pressure cylinder, particularly a slave cylinder, includes a housing with an internal cylinder, a piston which is displaceable therein, a spring arranged in a pressure space, and a tappet. This tappet is connected to the piston by the force of the spring in a frictional engagement and so as to be swivelable. The piston is made of metal and has a deep-drawn, cup-shaped part. In its interior a filling piece at which an annular space is formed at a piston surface facing toward the pressure space, which annular space can receive the compressed spring when the piston is in a top dead center position and is held by a stop at the front side of the internal cylinder. The purpose of the filling piece is to keep the relatively large and elongated free space within the piston free from hydraulic fluid in order to reduce the entire fluid volume in the hydraulic fluid and to prevent the formation and accumulation of air bubbles.

Since air in the intermediate space between the filling piece and the piston during the buildup of pressure in the pressure space also impairs the function of the hydraulic actuation device through its compressibility, it must be ensured that the shapes of the parts to be joined fit one another exactly and that the filling piece which is preferably made of plastic is prevented from falling out of the piston. The best fastening of the filling is afforded by a press fit around the indentation of the piston. Glue is advisably used for fixing and for filling up the remaining intermediate spaces.

The annular space in the piston surface at the filling piece tapers with increasing depth to a narrow annular surface on which the piston-side end of the spring comes to rest, while the cylinder-side end of the spring is supported at an end side of the internal cylinder in the housing. When the pressure cylinder is actuated, the spring with its uncontrolled movements is best guided in that the annular space has an outer and an inner ventilation or deaeration cone which has the added advantage when the pressure cylinder is installed horizontally that any air bubbles located in the pressure space automatically continue into a pressure medium line and can be removed by simple deaeration. Advantageously, the outer deaeration cone has an opening angle in the range of 5. deg to 20. deg, but preferably of about 10. deg, so as to optimize the function of the actuation device with respect to the transport of air bubbles and the guidance of the spring.

The object of the invention is accordingly to provide a piston for a pressure cylinder of a hydraulic actuation device in motor vehicles which has functional advantages over the prior art with respect to improved deaeration of the hydraulic system and guidance of the spring located in the pressure space.

This and other objects are met by a pressure cylinder for a hydraulic actuation device in motor vehicles that includes a housing with an internal cylinder. A piston is displaceable in the internal cylinder for forming a pressure space for a hydraulic fluid, the piston includes a hemispherical socket in an indentation. A spring is arranged in the pressure space, and a tappet is connected by a transmission part with a hemispherical cap. The tappet is in a frictional and swivelable engagement in the socket in an indentation by the force of the spring. The piston is a deep-drawn, cup-shaped part and includes a filling piece in the interior of the piston. An annular space is disposed at a piston surface facing toward the pressure space. The annular space is for receiving the spring in a compressed state when the piston is in a top dead center position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, a piston for a hydraulic actuation device with a filling piece is described with reference to two drawings.

DETAILED DESCRIPTION OF THE PRESENTLY PREFERRED EMBODIMENTS

Figure 1:
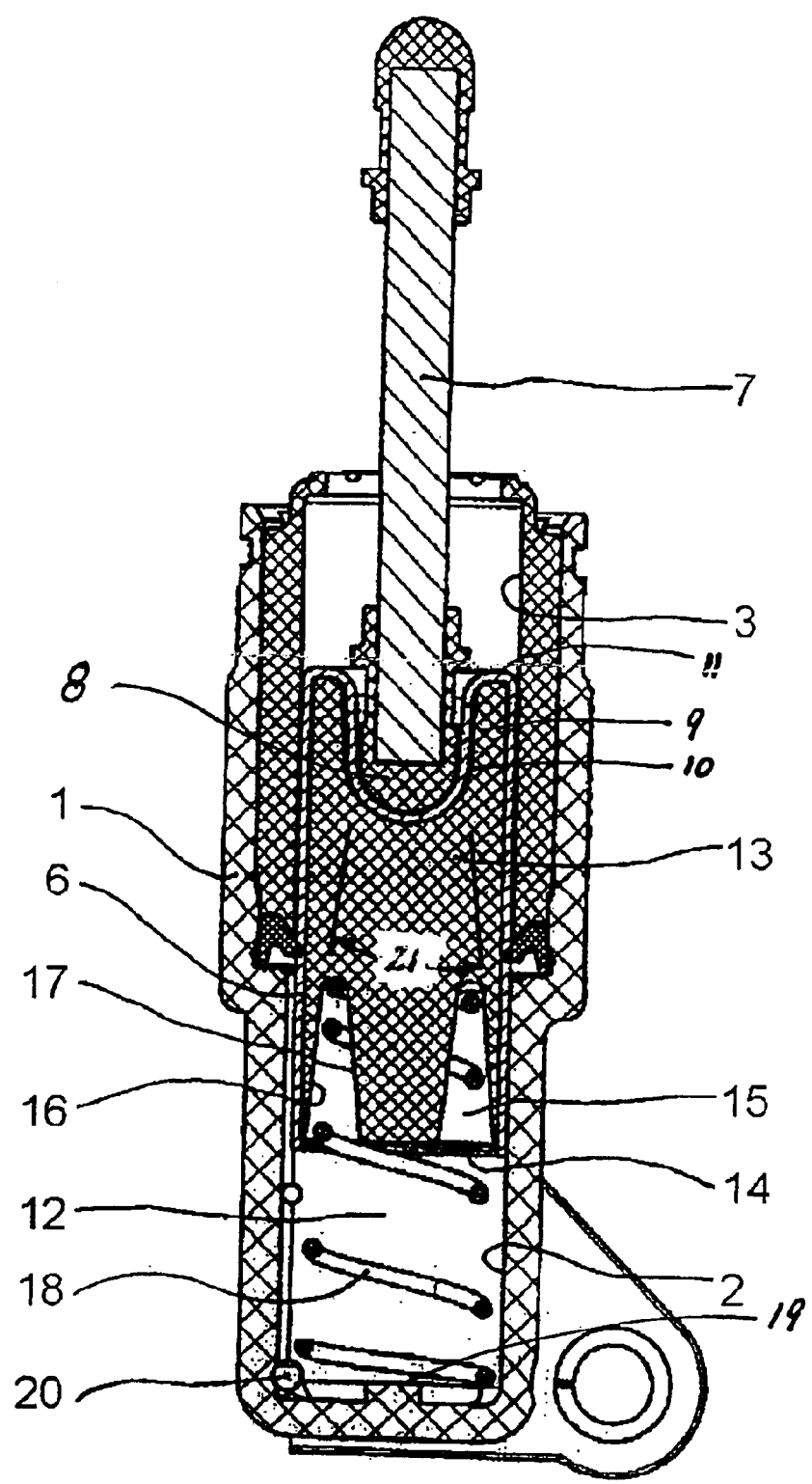
FIG. 1 is a cross-sectional view of a pressure cylinder with a piston in a middle position, wherein a filling piece is arranged in the interior of the piston and has an annular space for receiving a spring.

In FIG. 1, a housing for a pressure cylinder of a hydraulic actuation device in motor vehicles is designated by 1. This housing 1 has an internal cylinder 2, a seal 5, a sleeve 4 with an internal cylinder 3, and a stop 19 at an end side adjoining the internal cylinder 3.

According to FIG. 1, a piston 6 has a deep-drawn, cup-shaped part made of metal is arranged in a middle position in the housing 1 so as to be longitudinally displaceable and has in its interior a filling piece 13 which is joined with the piston 6 and forms a structural unit with the latter that can preferably not be disassembled.

An annular space 15 for receiving a spring 18 is formed at this filling piece 13 at a piston surface 14 facing toward a pressure space 12. The spring 18 is supported at the front side of the internal cylinder 3.

The annular space 15 in the piston surface 14 at the filling piece 13 tapers with increasing depth to a narrow annular surface on which the piston-side end of the spring 18 comes into contact, while the cylinder-side end of the spring 18 is supported at the front side of the internal cylinder 3. When the pressure cylinder is actuated, the piston 6 is displaced against a tappet 7 by the pressure of a hydraulic fluid in the pressure space 12 reinforced by the force of the spring 18, a clutch or a brake of the motor vehicle being actuated by means of this tappet 7.

The base of the deep-drawn piston 6 has an indentation 9 with a hemispherical cup or socket 10 which serves as a swivelable bearing support of a transmission part 8 with a hemispherical cap which is connected to the tappet 7. A ring-shaped edge 11 naturally remains around the indentation 9 and lengthens the jacket surface of the piston 6 beyond the seal 5.

Figure 2:
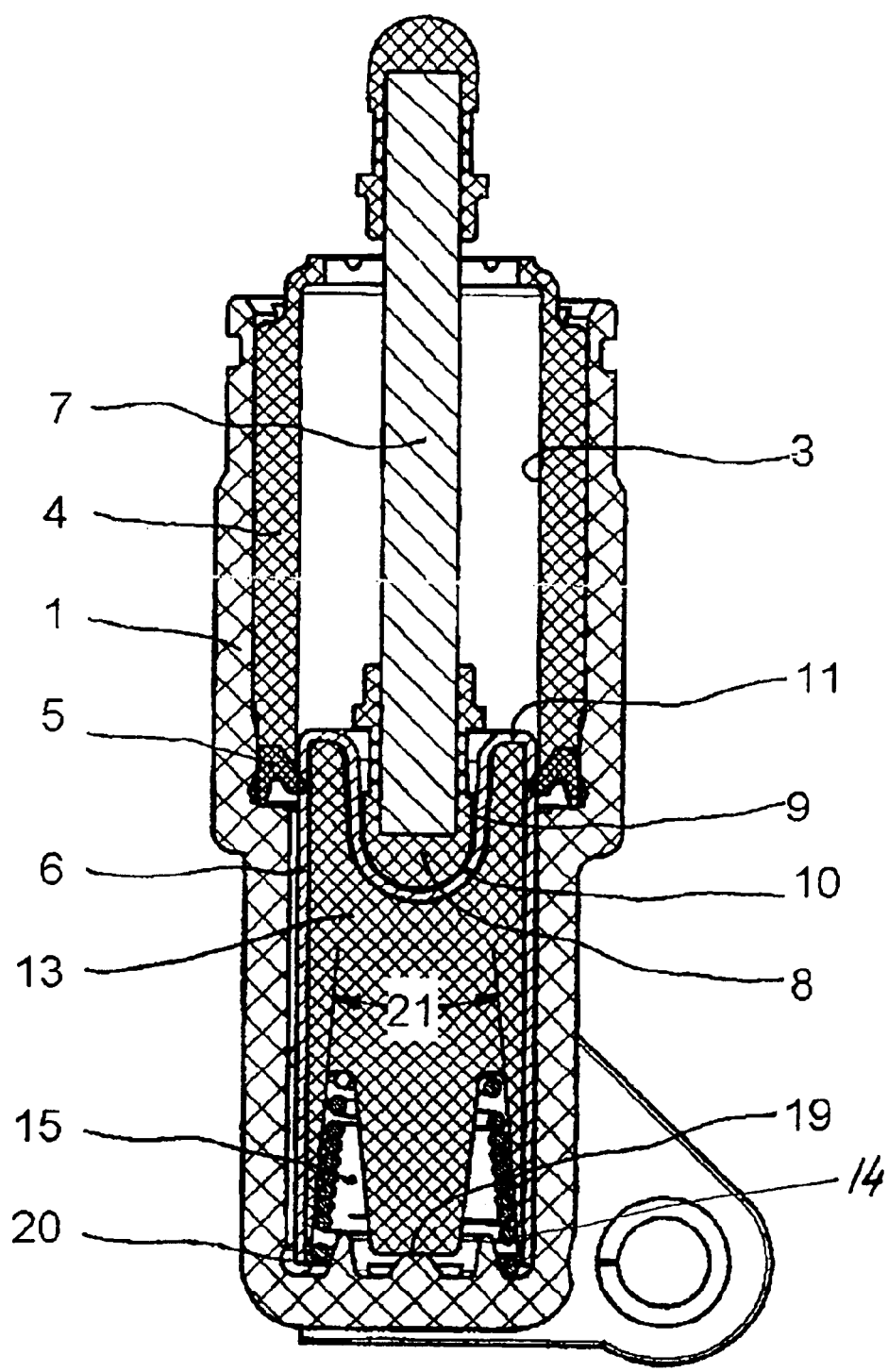
FIG. 2 is a cross-sectional view of a piston in a top dead center position, wherein the spring which is compressed in this position is arranged in the annular space which has an outer and an inner deaeration cone.

FIG. 2 shows the pressure cylinder with the structural unit comprising the piston 6 and the filling piece 13 in a fully displaced position in which the filling piece 13 contacts the stop 19 on the end surface of the internal cylinder 2, and the compressed spring 18 is received practically in its entirety by the annular space 15. This annular space 15 is bounded by an outer conical surface 16 and an inner conical surface 17 which have the advantage that any air bubbles which may be located in the pressure space 12 automatically continue into a pressure medium line 20 and can be removed by simple deaeration when the cylinder is horizontally oriented with the pressure medium line on top, and the piston is fully displaced toward the end surface. The outer conical surface 16 is preferably provided with an opening angle 21 in the range of 5 to 20 degrees, but preferably of about 10 degrees, which optimizes the function with respect to the transport of air bubbles and guidance of the spring 18 when the piston 6 is moved by the actuation device.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

| Reference numbers | |
|---|---|
| 1 | housing |
| 2 | internal cylinder |
| 3 | internal cylinder |
| 4 | sleeve |
| 5 | seal |
| 6 | piston |
| 7 | tappet |
| 8 | transmission part with a hemispherical cap |
| 9 | indentation |
| 10 | socket (hemispherical) |
| 11 | ring-shaped edge |
| 12 | pressure space |
| 13 | filling piece |
| 14 | piston surface |
| 15 | annular space |
| 16 | outer deaeration cone |
| 17 | inner deaeration cone |
| 18 | spring |
| 19 | stop |
| 20 | pressure medium line |
| 21 | opening angle |

What is claimed is:

1. A pressure cylinder for a hydraulic actuation device in motor vehicles comprising:

a housing including an inside wall and an end surface defining an internal cylinder;

a piston axially displaceable in the internal cylinder for forming a pressure space for hydraulic fluid, the piston including a hemispherical socket and an interior bounded by an outer conical surface facing said pressure space;

a filling piece in the interior forming an annular space between the filling piece and the outer conical surface;

a spring arranged in the pressure space and received in the annular space in a compressed state when the piston is fully displaced toward the end surface;

a tappet including a transmission part with a hemispherical cap pivotable in the socket; and a pressure medium line opening on said inside wall at said end surface, whereby said outer conical surface can exhaust air bubbles from the pressure space via the pressure medium line when the cylinder is horizontally oriented with the pressure medium line on top and the piston is fully displaced toward the end surface.

2. The pressure cylinder of claim 1, wherein the filling piece and the piston are joined in an air tight arrangement.

3. The pressure cylinder of claim 1, wherein the filling piece is made of plastic and the filling piece is secured in the piston to prevent the prevent the filling piece (13) from falling out.

4. The pressure cylinder of claim 3, wherein the filling piece has a press fit in the piston.

5. The pressure cylinder of claim 3, wherein the filling piece is glued to the piston.

6. The pressure cylinder of claim 1, wherein the filling piece has an inner conical surface bounding said annular space.

7. The pressure cylinder of claim 1, wherein the outer conical surface includes an opening angle in a range of 5 to 20 degrees.

8. The pressure cylinder of claim 7 wherein the opening angle is about 10 degrees.

9. The pressure cylinder of claim 1 wherein said end surface of said internal cylinder has a stop which is abutted by said filling piece when the piston is fully displaced toward the end surface.

* * * * *